United States Patent [19]

Schmidt et al.

[11] Patent Number: 6,015,539
[45] Date of Patent: Jan. 18, 2000

[54] FLUIDIZED BED PROCESS FOR PRODUCING ALUMINA FROM ALUMINUM HYDROXIDE

[75] Inventors: Hans Werner Schmidt; Martin Rahn, both of Frankfurt am Main; Werner Stockhausen, Bad Vilbel; Dietrich Werner, Messel; Martin Hirsch, Friedrichsdorf, all of Germany

[73] Assignee: Metallgesellschaft Aktiengesellschaft, Frankfurt am Main, Germany

[21] Appl. No.: 09/068,758

[22] PCT Filed: Nov. 2, 1996

[86] PCT No.: PCT/EP96/04764

§ 371 Date: Sep. 3, 1998

§ 102(e) Date: Sep. 3, 1998

[87] PCT Pub. No.: WO97/18165

PCT Pub. Date: May 22, 1997

[30] Foreign Application Priority Data

Nov. 14, 1995 [DE] Germany .............. 195 42 309

[51] Int. Cl.⁷ .................................................... C01F 7/02
[52] U.S. Cl. ................................................... 423/625
[58] Field of Search ............................................. 423/625

[56] References Cited

U.S. PATENT DOCUMENTS

| | | | |
|---|---|---|---|
| 3,565,408 | 2/1971 | Reh et al. | 423/625 |
| 3,672,069 | 6/1972 | Reh et al. | 34/20 |
| 4,076,796 | 2/1978 | Reh et al. | 423/625 |
| 4,529,579 | 7/1985 | Raahauge | 423/625 |
| 4,585,645 | 4/1986 | Sucech | 423/625 |
| 4,671,497 | 6/1987 | Schmitz et al. | 266/172 |

FOREIGN PATENT DOCUMENTS

| | | |
|---|---|---|
| 1559441 | 3/1968 | France . |
| 2032925 | 11/1970 | France . |
| 2313120 | 12/1976 | France . |
| 2559572 | 8/1985 | France . |
| 2019369 | 10/1979 | United Kingdom . |

*Primary Examiner*—Steven Bos
*Attorney, Agent, or Firm*—Herbert Dubno

[57] ABSTRACT

A process is disclosed for preparing anhydrous alumina from aluminum hydroxide which comprises feeding aluminum hydroxide into a first suspension preheater and partially dehydrating the aluminum hydroxide with a hot exhaust gas, transporting the partially dehydrated aluminum hydroxide with said exhaust gas to a first separating means and separately withdrawing the exhaust gas and the partially dehydrated aluminum hydroxide, and dividing the partially dehydrated aluminum hydroxide into a first and second partial stream of solids. The process uses a circulating fluidized bed comprising a fluidized bed reactor, a recycle separator connected to the upper portion of said fluidized bed reactor, and a return line for leading solids from said recycle separator to the lower portion of said fluidized bed reactor. The second partial stream of solids is fed into a second suspension preheater and contacted with hot exhaust gas from the recycle separator. The solids and the exhaust gas are transported to a second separating means and an exhaust gas stream is withdrawn and fed into the first suspension preheater. A dehydrated solids stream is fed into the fluidized bed reactor and the reactor temperature is adjusted to 850 to 1000° C. A third partial stream of solids is mixed with the first partial stream of solids to form a hot solids mixture. The hot solids mixture is cooled in at least one fluidized bed cooler and then is fed into the fluidized bed reactor. The hot solids mixture is cooled in at least one fluidized bed cooler.

4 Claims, 1 Drawing Sheet

FLUIDIZED BED PROCESS FOR PRODUCING ALUMINA FROM ALUMINUM HYDROXIDE

BACKGROUND OF THE INVENTION

This invention relates to a process of preparing anhydrous alumina from aluminum hydroxide in a circulating fluidized bed comprising a fluidized-bed reactor 8, a separator 6, and a return line, where the aluminum hydroxide is introduced into a first suspension preheater 2 operated by means of the exhaust gases of the fluidized-bed reactor 8 of the circulating fluidized bed, and is at least partially dehydrated, dehydrated aluminum hydroxide from the first suspension preheater 2 is introduced into a second suspension pre-heater 5 operated by means of the exhaust gases of the fluidized-bed reactor 8 of the circulating fluidized bed, and is furthermore dehydrated and then supplied to the circulating fluidized bed, which is operated by means of oxygen-containing fluidizing gas 10 indirectly heated in a subsequent cooling stage by the alumina produced, and by means of directly heated, oxygen-containing secondary gas 11 supplied at a higher level, where the indirect heating of the fluidizing gas is effected in a fluidized-bed cooler 23. Such a process is described in DE-A-1592140.

As against the conventional processes using a rotary kiln and the processes carried out in what is called the classical fluidized bed, the above-stated process is in particular characterized by favorable heat consumption values of about 720 to 800 kcal/kg, which depending on the quality of the alumina produced are considerably lower than the typical values for rotary kilns in the range from 1000 to 1100 kcal/kg. These values are on the one hand reached as a result of a near-stoichiometric combustion of the fuel and the substantial utilization of the waste heat of the exhaust gases, which leave the calcining zone, for predrying and partial dehydration. On the other hand, the recirculation of the heat of the calcined material to the calcining zone in the form of the fluidizing gas and the secondary gas heated in the fluidized-bed cooler represents a substantial contribution to the reduction of the heat consumption values. A further advantage of the process consists in that due to the stepwise combustion, namely at first only by means of fluidizing air understoichiometrically in the range of a high dispersion density, and then in the presence of secondary air stoichiometrically or slightly overstoichiometrically in the range of a low suspension density, an overheating which would impair the quality of the product made by such process is definitely avoided.

What is disadvantageous in the above-described process is the fact that at the generally required high calcining temperatures of 1000 to 1100° C. it is difficult to utilize the product heat in the actual calcining process. Either the gas streams required for a sufficient cooling of the product are so large that they cannot be completely used in the calcining process, or—in the case of a cooling against the gas streams required for the calcining process—the cooling of the product is not sufficient. Finally, the demands concerning the quality of the final calcined alumina have changed recently. What is desired in particular is an alumina of sandy quality, i.e. a high content of gamma-oxide. The changed requirements necessitate a considerable change in the execution of such process.

OBJECT OF THE INVENTION

The object underlying the invention is to provide a process for preparing anhydrous alumina from aluminum hydroxide, which satisfies the changed requirements concerning the oxide quality, and in particular has a minimum consumption of heat.

SUMMARY OF THE INVENTION

This object is achieved in that the process in accordance with the invention is carried out such that the temperature of the circulating fluidized bed is adjusted to a value in the range from 850 to 1000° C., the alumina withdrawn from the circulating fluidized bed is mixed for at least 2 minutes with 10 to 25 wt-% of the partially dehydrated aluminum hydroxide leaving the first stage in the direction of solid flow of the first suspension preheater 2, and the mixed material is cooled first in a multi-stage suspension cooler 15, 16, 17, 18, 19, 20 by heating secondary gas 11, and then in a fluidized-bed cooler 23 by indirectly heating fluidizing gas 10.

The system of the circulating fluidized bed used in the process in accordance with the invention comprises a fluidized-bed reactor, a separator for separating solids from the suspension discharged from the fluidized-bed reactor—generally a recycling cyclone—and a return line for returning the separated solids to the fluidized-bed reactor. The principle of the circulating fluidized bed is characterized in that in contrast to the "classical" fluidized bed, where a dense phase is separated from the gas space disposed above the same by a considerable density difference, there are states of distribution without a defined boundary layer. A density difference between the dense phase and the dust space disposed above the same does not exist, but the concentration of solids inside the reactor decreases from the bottom to the top. From the upper portion of the reactor a gas-solids suspension is discharged. When defining the operating conditions by means of the characteristics of Froude and Archimedes, the following ranges are obtained:

$$0.1 \leq 3/4 \cdot Fr^2 \cdot \frac{\rho_g}{\rho_k - \rho_g} \leq 10,$$

or $$0.01 \leq Ar \leq 100,$$

where $$Ar = \frac{d_k^3 \cdot g(\rho_k - \rho_g)}{\rho_g \cdot v^2} \text{ and}$$

$$Fr^2 = \frac{u^2}{g \cdot d_k}$$

In the formulae:
u is the relative gas velocity in m/sec
Ar is the Archimedes number
Fr is the Froude number
$\rho g$ is the density of the gas in kg/m$^3$
$\rho k$ is the density of the solid particle in kg/m$^3$
$d_k$ is the diameter of the spherical particle in m
v is the kinematic viscosity in m$^2$/sec
g is the gravitational constant in m/sec$^2$.

The mixing of the solid streams, derived on the one hand via the by-pass line from the second suspension preheater in the direction of solid flow, and on the other hand from the circulating fluidized bed, for at least 2 minutes is essential for this process. Only then, a sufficient separation of the chemically bound water, which is still contained in the at least partially dehydrated aluminum hydroxide is achieved, and thus a sufficiently low loss of ignition is ensured. The mixing of the solid streams is effected particularly advantageously by the steam produced during mixing.

The fluidizing gas velocity upstream of the secondary gas inlet generally lies in the range from 7 to 10 m/sec.

An advantageous embodiment of the invention consists in that the pressure loss in the fluidized-bed reactor, which is a function of the solids content, is adjusted to <100 mbar.

In accordance with a further advantageous embodiment of the invention the partially dehydrated aluminum hydroxide leaving the first suspension preheater 2 is separated in a separator disposed before the electrostatic filter.

In accordance with a further embodiment of the invention, finally, it is advantageous that the final cooling of the alumina produced is effected by a multi-stage fluidized-bed cooling, where through an indirect heat exchange in the first stage the fluidizing gas for the fluidized-bed reactor of the circulating fluidized bed, and in the subsequent stages a liquid heat transfer medium is heated. In this way, the amount of air used for cooling the calcined material can most easily be adapted to the amount of fluidizing air required by the fluidized-bed reactor of the circulating fluidized bed.

The outstanding advantage of the process in accordance with the invention consists in that the calcining process including preheating and cooling can most easily be adapted to the respective quality demands. For it is common practice to require a certain product quality as regards BET surface, loss of ignition and Â-oxide. This leads to the reaction temperature to be adjusted in the circulating fluidized bed and the amount of merely dehydrated aluminum hydroxide to be passed by the circulating fluidized bed as a by-pass. This means that with increasing BET surface both the calcining temperature in the circulating fluidized bed and the by-pass quantity for aluminum hydroxide must be adjusted towards the lower limit values claimed. On the other hand, with decreasing BET surface the aforementioned values must be shifted towards the upper limit values claimed. In the case of an admissible increased loss of ignition the by-pass quantity for aluminum hydroxide can furthermore be increased within the claimed limits under otherwise constant operating conditions, in particular at a constant calcining temperature. In this way, a further reduction of the heat consumption value can be achieved.

A further advantage of the process in accordance with the invention consists in a heat consumption value, which depending on the quality demands to be met by the alumina produced is considerably below the so far usual values.

BRIEF DESCRIPTION OF THE DRAWINGS

The invention will now be explained in detail and by way of example with reference to the Figure and the Example.

The FIGURE is a flow diagram of the process in accordance with the invention.

DETAILES DESCRIPTION OF THE DRAWINGS

Figure 1:
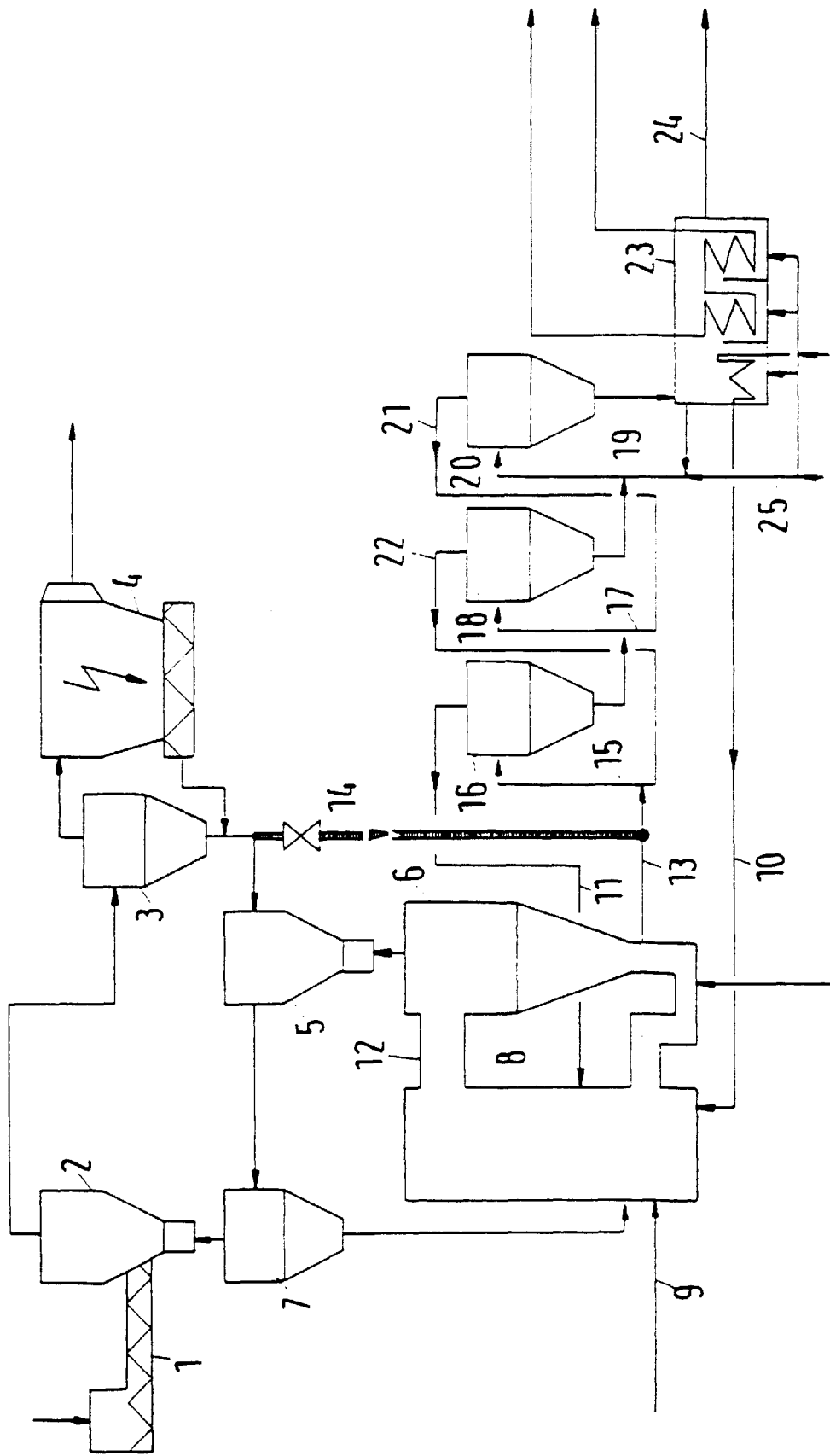

The filter-moist aluminum hydroxide is introduced by means of a screw conveyor 1 into the first suspension preheater 2, and is entrained by the exhaust gas stream coming from the second suspension preheater 5. Subsequently the gas/material stream is separated in the subsequent cyclone separator 3.

The exhaust gas discharged from the cyclone separator 3 is supplied to an electrostatic gas cleaning unit 4 for the purpose of dedusting and then to a chimney (not shown).

The solid matter leaving the cyclone separator 3 and the electrostatic gas cleaning unit is then for the larger part supplied by a metering device to the second suspension preheater 5, and for the smaller part to the by-pass line 14. In the second suspension preheater 5 the solid matter is entrained by the exhaust gas leaving the recycling cyclone 6 of the circulating fluidized bed and is furthermore dewatered or dehydrated. In the separating cyclone 7 there is again effected a separation of the gas/material stream, where the dehydrated material is supplied to the fluidized-bed reactor 8, and the exhaust gas is passed into the above-mentioned suspension preheater 2.

The supply of the fuel required for calcining is effected via line 9, which is disposed at a small height above the grid of the fluidized-bed reactor 8. The oxygen-containing gas streams required for combustion are supplied as fluidizing gas via line 10 and as secondary gas via line 11. Since the gas is supplied in the form of fluidizing gas and secondary gas, a comparatively high suspension density is achieved in the lower part of the reactor between grid and secondary gas inlet 11, and upstream of the secondary gas inlet 11 a comparatively low suspension density is achieved.

The gas-solids suspension is introduced into the recycling cyclone 6 of the circulating fluidized bed via the connecting line 12, in that a further separation of solids and gas is effected. The solids leaving the recycling cyclone 6 via line 13 are mixed with a part of the solids originating from the cyclone 3 and the electrostatic gas cleaning unit, which are supplied via line 14, and are supplied to the first suspension cooler comprising the riser 15 and the cyclone separator 16. The exhaust gas of the cyclone separator flows through line 11 into the fluidized-bed reactor 8, the solids are supplied to the second suspension cooler comprising the riser 17 and the cyclone separator 18, and then to the third suspension cooler comprising the riser 19 and the cyclone separator 20. The gas flow through the individual suspension coolers is effected countercurrently to the solids via lines 21 and 22. Upon leaving the last suspension cooler, the alumina produced is subjected to a final cooling in the fluidized-bed cooler 23 equipped with three cooling chambers. In the first chamber the fluidizing gas supplied to the fluidized-bed reactor 8 is heated, and in the subsequently connected two chambers there is effected a cooling against a heat-transfer medium, preferably water, which flows countercurrently. The alumina is finally discharged via line 24.

EXAMPLE

By means of the screw conveyor 1 the first suspension preheater 2 is supplied with 126,360 kg/h aluminum hydroxide containing 7 wt-% mechanically bound water. By means of the exhaust gas supplied from the cyclone separator 7 at a temperature of 306° C. a first drying is effected. Upon separation in the cyclone separator 3, the solids are subjected to a further drying and dehydration in the second suspension preheater 5 by means of the exhaust gases supplied from the recycling cyclone 6 of the circulating fluidized bed at a temperature of 950° C. The exhaust gas leaving the last cyclone separator 3 is then dedusted in the electrostatic filter 4 and supplied to the chimney. Its quantity is 132,719 Nm³/h. The solids produced in the cyclone separator 7 are then introduced into the fluidized-bed reactor 8 of the circulating fluidized bed.

The circulating fluidized bed is operated at a temperature of 950° C. Via line 9 it is supplied with 5,123 kg/h fuel oil, via line 11 with 60,425 Nm³/h secondary air, and via line 10 with 12,000 Nm³/h fluidizing air. The fluidizing air has a temperature of 188° C., and the secondary air has a temperature of 525° C. A gas stream in an amount of 98,631

Nm³/h with an oxygen content of 2.23 vol.-%, which is supplied to the suspension preheaters 5 and 2, as well as solids in the amount of 66,848 kg/h are leaving the circulating fluidized-bed. Before entering the riser 15 of the first suspension cooler, this stream of solids discharged via line 13 is mixed with 15,262 kg/h solids supplied via line 14, where a mixing temperature of 608° C. has been set. After its passage through the riser 15, the gas-solids suspension flows into the cyclone separator 16 and from there to the subsequent suspension coolers comprising the risers 17 and 19 and the cyclone separators 18 and 20, respectively. In the three suspension coolers the solids are cooled step by step to 525° C., 412° C. and 274° C., respectively. At the same time, the secondary gas stream supplied to the fluidized-bed reactor 8 via line 11 is heated to a temperature of 525° C. The suspension coolers are operated by means of the directly heated fluidizing air of the subsequent fluidized-bed cooler 23 and by means of process air supplied via line 25 in an amount of 33,000 Nm³/h.

The final cooling of the solids is effected in the fluidized bed cooler 23, whose first chamber is supplied with 7,200 Nm³/h fluidizing air, and whose 2nd and 3rd chambers are each supplied with 7,000 Nm³/h fluidizing air. The temperatures of the solids, which were achieved in the individual chambers, are 238° C., 135° C. and 83° C. The air used for cooling in the first chamber of the fluidized-bed cooler 23 in an amount of 12,000 Nm³/h, which is supplied to the fluidized-bed reactor 8 as fluidizing air, is heated to a temperature of 188° C. through an indirect heat exchange. In the second and third cooling chambers of the fluidized-bed cooler 23 the cooling water, which countercurrently to the solids flows through the cooling chambers in an amount of 350,000 kg/h, is heated from 40° C. to 49° C. The fluidizing air leaving the fluidized-bed cooler 23 has a temperature of 153° C. and is produced in an amount of 21,200 Nm³/h. As mentioned above, it is supplied to the suspension cooler. 77,111 kg/h alumina with a loss of ignition of 0.5% and a BET surface of 70 m²/g are leaving the fluidized-bed cooler 23.

We claim:

1. A process for preparing anhydrous alumina from aluminum hydroxide which comprises the steps of:
   (a) feeding aluminum hydroxide into a first suspension preheater and contacting the aluminum hydroxide therein with a hot exhaust gas to partially dehydrate the aluminum hydroxide, transporting the partially dehydrated aluminum hydroxide with said exhaust gas to a first separating means and separately withdrawing from said first separating means the exhaust gas and the partially dehydrated aluminum hydroxide, dividing the partially dehydrated aluminum hydroxide into a first and second partial stream of solids, said first partial stream of solids amounting to 10 to 25% by weight of the aluminum hydroxide leaving the first suspension preheater;
   (b) providing a circulating fluidized bed system comprising a fluidized bed reactor, supplied with fuel and with air as a fluidizing gas, a recycle separator connected to the upper portion of said fluidized bed reactor, and a return line for leading solids from said recycle separator to the lower portion of said fluidized bed reactor;
   (c) feeding said second partial stream of solids into a second suspension preheater and contacting said second partial stream of solids therein with hot exhaust gas from said recycle separator connected to said fluidized bed reactor, transporting the solids and the exhaust gas from the second suspension preheater to a second separating means and separately withdrawing from said second separating means an exhaust gas stream which is fed into the first suspension preheater and an at least partially dehydrated solids stream which is fed into the fluidized bed reactor, combusting said fuel in said fluidized bed reactor, and adjusting the temperature in said fluidized bed reactor in a range of 850 to 1000° C.;
   (d) withdrawing a third partial stream of solids from the solids being separated in the recycle separator and mixing said third partial stream of solids with said first partial stream of solids for at least 2 minutes to form a hot solids mixture; and
   (e) feeding said hot solids mixture formed in step (d) into a multi-stage suspension cooler and therein cooling said hot solids mixture in direct contact with air, withdrawing air from said multi-stage suspension cooler and feeding the air into the fluidized bed reactor as secondary air, then indirectly cooling said hot solids mixture with air in at least one fluidized bed cooler and feeding the air from the fluidized bed cooler into said fluidized bed reactor as said fluidizing gas, and withdrawing anhydrous alumina from said fluidized bed cooler.

2. The process defined in claim 1 wherein according to step (b) pressure loss in the fluidized bed reactor is adjusted to less than 100 mbar.

3. The process defined in claim 1, wherein according to step (a) following discharge from the first separating means the exhaust gas is passed through an electrostatic filter and solids separated in said filter are added to the partially dehydrated aluminum hydroxide separated in said first separating means.

4. The process defined in claim 1, wherein according to step (e) the fluidized bed cooler is also multi-staged and the solids mixture from the multi-stage suspension cooler is at first passed through a first fluidized bed indirectly cooled with air and then through a second fluidized bed indirectly cooled with a liquid heat transfer medium.

* * * * *